No. 679,727. Patented Aug. 6, 1901.
J. R. CORBETT.
FASTENER FOR CASKET COVERS.
(Application filed Jan. 12, 1901.)
(No Model.)
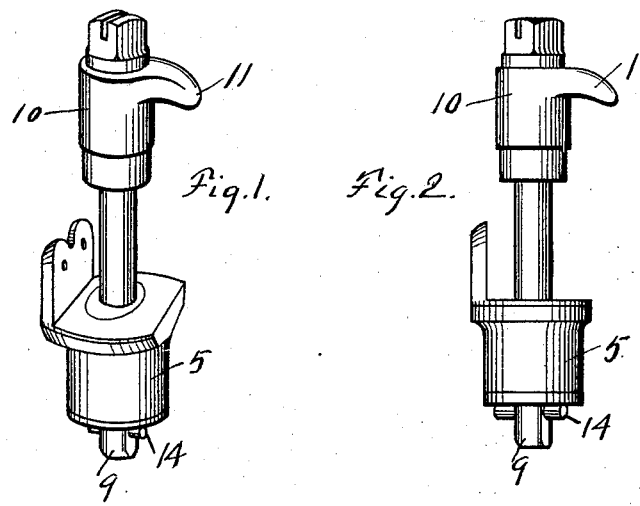
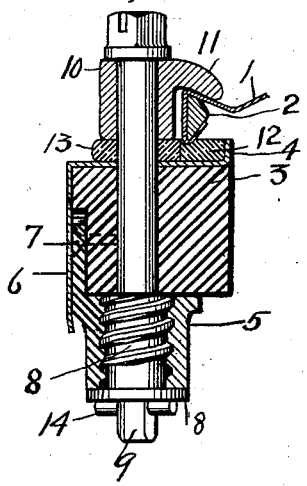
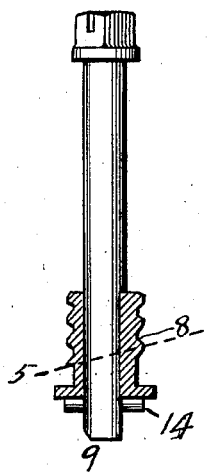
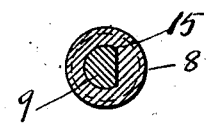
Witnesses
D. W. Gould.
Benj. R. Carlin
James R. Corbett, Inventor
By Geo. B. Selden,
Attorney

UNITED STATES PATENT OFFICE.

JAMES R. CORBETT, OF ROCHESTER, NEW YORK.

FASTENER FOR CASKET-COVERS.

SPECIFICATION forming part of Letters Patent No. 679,727, dated August 6, 1901.

Application filed January 12, 1901. Serial No. 43,051. (No model.)

*To all whom it may concern:*

Be it known that I, JAMES R. CORBETT, a resident of Rochester, in the county of Monroe and State of New York, have invented certain new and useful Improvements in Fasteners for Casket-Covers; and I do hereby declare the following to be a full, clear, and exact description of the invention, such as will enable others skilled in the art to which it pertains to make and use the same.

The invention relates to means for fastening casket-covers, and has for its object to increase the efficiency and ease of manipulation of such devices.

The invention consists in the construction herein described and pointed out.

In the accompanying drawings, Figure 1 is a perspective of a fastening-bolt and connected devices. Fig. 2 is a side elevation of the same. Fig. 3 is a horizontal longitudinal section of the improvement, including a portion of the cover and a casket-bar. Fig. 4 is a side elevation of a bolt, a screw-threaded sleeve being shown in section. Fig. 5 is a transverse section of the bolt and sleeve.

Numeral 1 denotes a casket-cover, and 2 is a stiffening-bar situated in a fold of the edge of the cover, as indicated in Fig. 3.

3 denotes a wooden rim or bar, and 4 is a cover therefor.

5 denotes a socket having a flange 6, secured to the rim by screw 7. The socket 5 receives a screw-threaded flanged collar 8, as shown in Fig. 3.

9 is a headed bolt which connects the collar and rim to a short tube 10, having a hook 11 to hold the cover and its stiffening-bar down upon a rubber strip 12, situated on the rim-cover.

13 denotes a rubber washer situated between tube 10 and the rim.

14 is a pin to hold the bolt against relative lengthwise movement. That part of the bolt which is within the sleeve 8 has such form, substantially as indicated at 15 on Fig. 5, as to prevent rotation independently of the sleeve, whereby it is adapted to screw the sleeve in the socket 5.

The elastic strip and washer situated, respectively, between the cover and tube 10 and the rim provide, when the parts are assembled as indicated in Fig. 3, that the cover may be more firmly fastened to the rim by turning the bolt to force the sleeve and tube toward each other, the edge of the cover being embedded in the rubber by the operation, making an air-tight joint.

I claim—

1. The combination of the rotatable bolt, the tube having a hook to engage the casket-cover, the bar 3, the socket fixed to said bar, the collar rotatable with the bolt, said collar and socket having a screw-thread connection, and means for preventing the bolt from being drawn through the collar.

2. The combination of the bolt having a flattened side, the exteriorly-threaded collar surrounding the bolt and having an interior face corresponding to the flattened part of said bolt to prevent independent rotation, the threaded socket screwing on the collar, the pin passed through the bolt below the collar to hold the bolt from being drawn up through the same, and devices for engaging the bolt to the casket-cover.

3. The combination of the bolt having a flattened side, the exteriorly-threaded collar surrounding the bolt, devices for preventing independent rotation of the collar and bolt, the threaded socket screwing on the collar, a device to hold the bolt from being drawn up through the same, and means for engaging the bolt to the casket-cover.

4. The combination of the bolt, the tube 10 having a hook to engage a casket-cover, the casket-bar 3, the rubber situated between the tube and bar, a flanged collar on the bolt and bearing on the bar, a socket situated below and fixed to the bar and having a screw-thread connection with the collar, and the pin, all substantially as set forth, whereby the rotation of the bolt may draw said collar and compress the tube upon the rubber.

5. In combination the casket-bar 3, the tube 10 having hook 11, the collar 8, the bolt passing through the collar and bar, the pin to prevent the bolt from being drawn up through the collar, and devices situated between the bar and the pin whereby the turning of the bolt forces the tube toward the bar.

JAMES R. CORBETT.

Witnesses:
 GEO. B. SELDEN,
 J. M. SHERMAN.